(12) United States Patent
Unger

(10) Patent No.: US 7,353,158 B2
(45) Date of Patent: Apr. 1, 2008

(54) INTER INTEGRATED CIRCUIT EXTENSION VIA SHADOW MEMORY

(75) Inventor: Robert A. Unger, El Cajon, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 570 days.

(21) Appl. No.: 11/011,865

(22) Filed: Dec. 13, 2004

(65) Prior Publication Data

US 2006/0129370 A1    Jun. 15, 2006

(51) Int. Cl.
G06F 17/50 (2006.01)
G06G 7/48 (2006.01)
H04M 1/00 (2006.01)
H04B 1/38 (2006.01)

(52) U.S. Cl. ............... 703/14; 703/13; 703/20; 455/550.1; 455/557

(58) Field of Classification Search ........... 703/13, 703/14, 20; 455/557, 550.1
See application file for complete search history.

(56) References Cited

U.S. PATENT DOCUMENTS

| | | | |
|---|---|---|---|
| 7,117,283 B2* | 10/2006 | Trembley | 710/110 |
| 7,228,154 B2* | 6/2007 | Champion et al. | 455/557 |
| 2004/0165905 A1* | 8/2004 | Lee | 399/75 |
| 2006/0095638 A1* | 5/2006 | Unger | 710/310 |

OTHER PUBLICATIONS

Robert A. Unger, "Extending I2C Over Wireless Links." Sony Technical Symposium, pp. 36-37. Nov. 2004.*
Total Phase, Inc. "I2C Background." © 2001-2007. http://www.totalphase.com/support/articles/article01/?print.*
David Kalinsky and Roee Kalinsky. "Introduction to I2C." Jul. 31, 2001. http://www.embedded.com/story/OEG20010718S0073; jsessionid=EZCXKGY0J2DISQSNDLOSKHSCJUNN2JVN?printable=true.*

* cited by examiner

*Primary Examiner*—Paul Rodriguez
*Assistant Examiner*—Ayal Sharon
(74) *Attorney, Agent, or Firm*—John L. Rogitz

(57) ABSTRACT

Embodiments of the present invention include a system for accessing a memory device comprising a master device coupled to a first serial bus. The system further comprises a slave device coupled to a second serial bus wherein the slave device comprises a first memory. The system further includes a slave device simulator coupled to the first serial bus and coupled to a long distance system specific interconnection, wherein the slave device simulator comprises a first shadow memory of the first memory and wherein a master device simulator is coupled to the second serial bus and coupled to the system specific interconnection. The master device comprises a second shadow memory of the slave device. Data read operations of the master may be satisfied directly from the slave device simulator shadow memory. Data writes from the master are propagated to the slave device and data coherency routines update the shadow memories accordingly.

23 Claims, 7 Drawing Sheets

120

500

```
comparing a value of a slave device memory to a value of a master
device simulator memory
510
                              ↓
identifying a difference between the slave device memory and the
master device simulator memory
520
                              ↓
forwarding the difference from the master device simulator to a slave
device simulator
530
                              ↓
updating a slave device simulator memory to reflect the change of the
slave device memory
540
```

FIGURE 5

INTER INTEGRATED CIRCUIT EXTENSION VIA SHADOW MEMORY

TECHNICAL FIELD

The invention relates to the field of data communications. More specifically, embodiments of the present invention relate to a method for wirelessly extending the distance between a slave device and a master device on a communication path, e.g., an inter integrated circuit (I2C) bus.

BACKGROUND ART

Electronic circuits and systems often communicate with one another via a communication bus. One type of communication bus is the inter-integrated circuit bus (I2C bus). The 120 bus provides a communication link between integrated circuits (ICs) and electronic systems. Traditionally, an I2C bus consists of a master device and one or more slave devices.

Conventional 120 bus communication performs well when the slave device(s) are physically close to the master device and connected using wires.

However, when the distance between the slave device(s) and the master device is increased using a wireless repeater, a latency is introduced. For write operations, the latency typically does not affect performance. However, for read operations, the latency greatly reduces the performance of the bus because the master device must wait to receive the data requested. Sometimes the latency during a read is mistaken for malicious activity on the bus and causes the bus to become inoperable.

A bus buffer may be used when cables provide the physical connection and the distance is limited to a few meters. However, some applications need to traverse a greater distance and in other cases, the physical connection may even be wireless. Therefore, other solutions are needed.

SUMMARY OF THE INVENTION

In one embodiment, a shadow memory is used on each side of the extended I2C bus. The master device side memory contains a copy of the slave device's registers for local read by the master device. This permits the master device to be separated from the slave device(s) by any distance. The overall communication system includes a master device coupled to a slave device simulator using an I2C bus. A system specific interconnect, e.g., long distance communication bus, is then used to communicatively couple the slave device simulator to a master device simulator. The master device simulator is then coupled to the slave device using an I2C bus. The system specific interconnection may be any number of well-known communication busses and protocols.

One end of the novel communication system is an I2C slave device simulator. The other end of the system is an I2C master device simulator. Any number of methods can be used to exchange data between the two simulators. The slave device simulator responds to I2C exchanges with from the master device. The master device simulator initiates I2C exchanges with the slave device.

In operation, writes by the master device are captured by the slave device simulator and forwarded to the master device simulator during otherwise idle time, for instance. Whenever a change in content is detected, the new data is forwarded by the master device simulator to the slave device simulator. This cache of current data is maintained in the slave device simulator's shadow memory. Reads by the master device obtain their data from the shadow memory located in the slave device simulator. Alternatively, register locations for inclusion in the shadow memory can be fixed at system design time or learned dynamically by noting which locations are being read by the master device.

More specifically, embodiments of the present invention include a system for accessing a memory device comprising a master device coupled to a first serial bus. The system further comprises a slave device coupled to a second serial bus wherein the slave device comprises a first memory. The system further includes a slave device simulator coupled to the first serial bus and coupled to a system specific interconnection, wherein the slave device simulator comprises a first shadow memory of the first memory and wherein a master device simulator is coupled to the second serial bus and coupled to the system specific interconnection. The master device comprises a second shadow memory of the slave device. The system specific interconnection may be a long distance communication channel.

Embodiments of the invention further include a method for writing data comprising generating a data write request at a master device, wherein the data write request comprises a memory address of a slave device. The method further includes receiving the data write request at a slave device simulator, forwarding the data write request from the slave device simulator to a master device simulator. The method further includes writing data to the memory address of the slave device. Data coherency processes described below then update a shadow memory located on the slave device simulator.

Embodiments of the present invention further comprise a method for reading data. The master device issues a read command to the slave device simulator which responds to the read by supplying contents of the shadow memory located in the slave device simulator without need of communicating over the system specific interconnection.

Embodiments of the present invention further include a method of maintaining data coherency. The method includes comparing a value of a slave device memory (shadow memory) to a value of a master device simulator memory and identifying any differences between the slave device memory and the master device simulator memory. The method further includes forwarding the differences from the master device simulator to a slave device simulator and updating a slave device simulator memory (shadow memory) to reflect the change of the slave device memory.

BRIEF DESCRIPTION OF THE DRAWINGS

The above and other objects and advantages of the present invention will be more readily appreciated from the following detailed description when read in conjunction with the accompanying drawings, wherein:

FIG. 5 is a flow diagram of an exemplary computer controlled method of maintaining data coherency in accordance with embodiments of the present invention.

DETAILED DESCRIPTION OF THE INVENTION

Reference will now be made in detail to embodiments of the present invention, a communication bus extension via a shadow memory, examples of which are illustrated in the accompanying drawings. In one embodiment, the communication bus is a serial bus, e.g., the I2C bus. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

It is desired to extend I2C busses a long distance. A bus buffer such as the Phillips P82B715 can be used when cables provide the physical connection and the distance is limited to a few meters. However, some applications need to traverse greater distances and the physical connection may be wireless.

Embodiments of the present invention use a shadow memory on the master side of the extended I2C bus. The shadow memory comprises a copy of the slave device's registers for local read by the master. The present invention permits the master device to be separated from the slave device(s) by any distance without experiencing the latency suffered by forwarding read requests over a link and waiting the data to be replied. Data coherency processes described herein operate to update the contents of the master side shadow memory (located within the slave device simulator).

Figure 1:
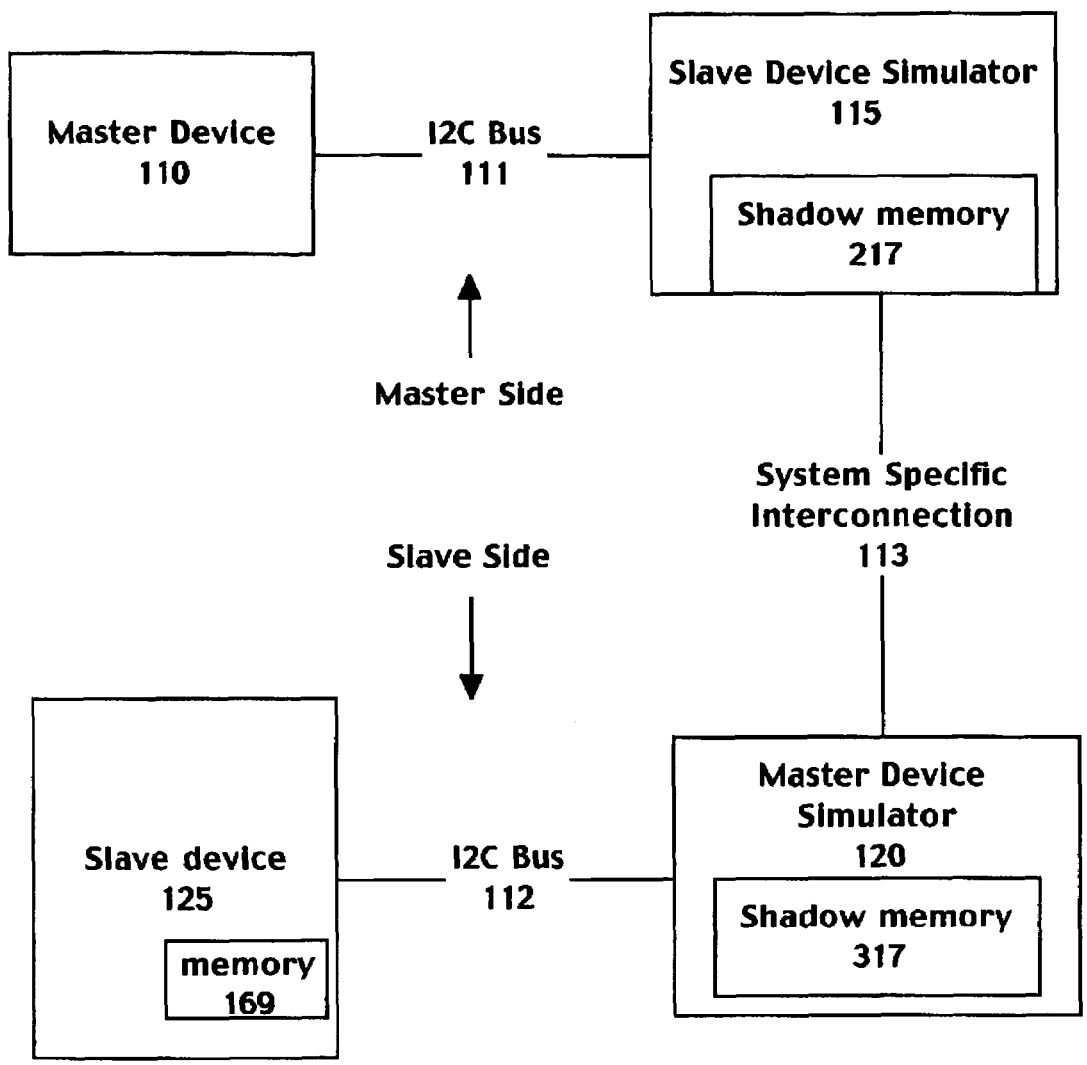
FIG. 1 is a block diagram of an exemplary communication system for extending an I2C bus in accordance with embodiments of the present invention.

FIG. 1 is a block diagram of an exemplary system 100 for extending an I2C bus in accordance with embodiments of the present invention. An I2C bus is a serial interface for accessing memory devices. Typically, a master device sends out an address using the serial protocol and depending on the direction, the operation will either be a read operation or a write operation. In the case of a write, the data flow is in one direction and the serial data coming from the master switches from address to data and the operation completes. In the case of a read operation, the address goes out then the data direction is reversed and the master pulls data from the slave device.

Referring to system 100 of FIG. 1, master device 110 is coupled to a first I2C bus 111. Coupled to the first I2C bus is also a slave device simulator 115 having a shadow memory 217. A long distance system specific interconnection 113 couples the slave device simulator to a master device simulator 120. The master device simulator 120 has a shadow memory 317 and is coupled to the slave device 125 via a second I2C bus 112. The slave device comprises a memory or register 169. Any number of well-known communication channels and protocols can be used as bus 113. Link 113 may be wired or wireless.

Embodiments of the present invention use a communication link 113 that is not necessarily an I2C bus to extend the distance between the master device 110 and the slave device 125. In one embodiment of the invention, a shadow memory on both the slave side 317 and the master side 217 is used to eliminate the problem of latency associated with relaying read requests and data between the slave device and the master device. In one embodiment of the invention, a shadow memory 217 is coupled to the slave device simulator 115 and a slave device is coupled to the master device simulator 120. The shadow memory 217 on the master device side acts like a local memory and allows the master device to read data without latency. Shadow memory 317 in master device simulator 120 allows updates to slave memory 169 to be detected and propagated as required.

It is appreciated that the system specific interconnection 113 can be any communication interface including any wireless communication link such as 802.11 or any wired communication interface such as an RS 232 communication interface. The system specific interconnection 113 could also be a network such as the Internet, or an Intranet and may be a long distance interconnection.

In one embodiment of the invention, the slave device is a display device and the master device is a digital media source. However, it is appreciated that the slave device and the master device can be any electronic device capable of communicating over the novel communication system of the present invention.

Figure 2:
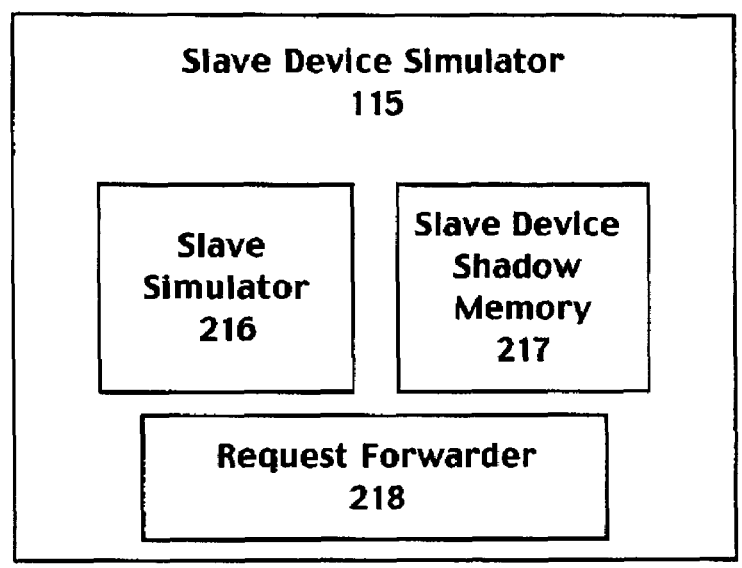
FIG. 2 is a block diagram of an exemplary slave device simulator device including a slave device shadow memory in accordance with embodiments of the present invention.

FIG. 2 is a block diagram of an exemplary slave device simulator 115 including a slave device shadow memory 217 in accordance with embodiments of the present invention. In one embodiment of the invention, the slave device simulator 115 comprises slave simulator logic that allows the slave device simulator to interact with the master device 110 of FIG. 1 as a normal I2C slave device. In one embodiment of the invention, the slave device simulator 115 further comprises a request forwarder 218 for forwarding write requests made by the master device to the slave device side of the system specific interconnection 113. In one embodiment of the invention, the shadow memory 217 comprises a multiple of 256 bytes of memory, but could be any size and memory organization.

Figure 3:
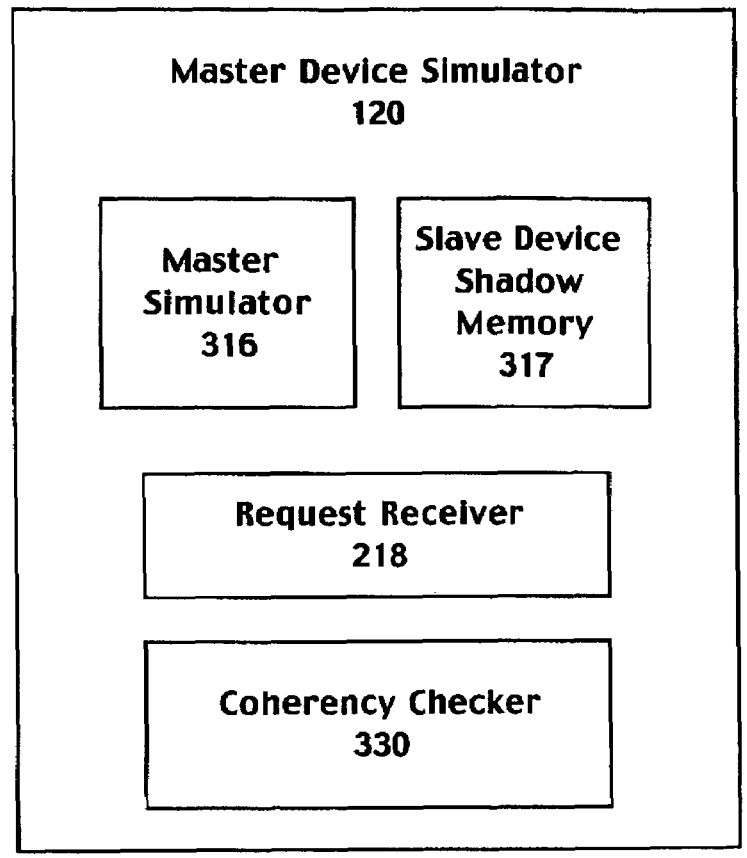
FIG. 3 is a block diagram of an exemplary master device simulator device including a slave device shadow memory in accordance with embodiments of the present invention.

FIG. 3 is a block diagram of an exemplary master device simulator 120 including a slave device shadow memory 317 in accordance with embodiments of the present invention. The master device simulator comprises master device simulator logic so that the master device simulator can act like an I2C master device when interacting with the slave device. In one embodiment of the invention, the master device simulator comprises a write request receiver for receiving a write request that is forwarded from the slave device simulator 115. The master device simulator 120 then executes the request as if it were an actual master device. In one embodiment of the invention, the shadow memory 317 comprises a multiple of 256 bytes of memory, but could be of any size and memory organization.

In one embodiment of the invention, the master device simulator 120 also comprises a coherency checker 330. The coherency checker checks the value of a slave device memory 169 (FIG. 1) against the shadow memory 317. In one embodiment of the invention, the coherency checker 330 is constantly polling the slave device 125 (FIG. 1) for data changes. When a change is identified, the master device 120 updates the slave device shadow memory 317 to reflect the changes of the slave device. The shadow memory 217 in the slave device simulator is also updated in response thereto.

Figure 4:
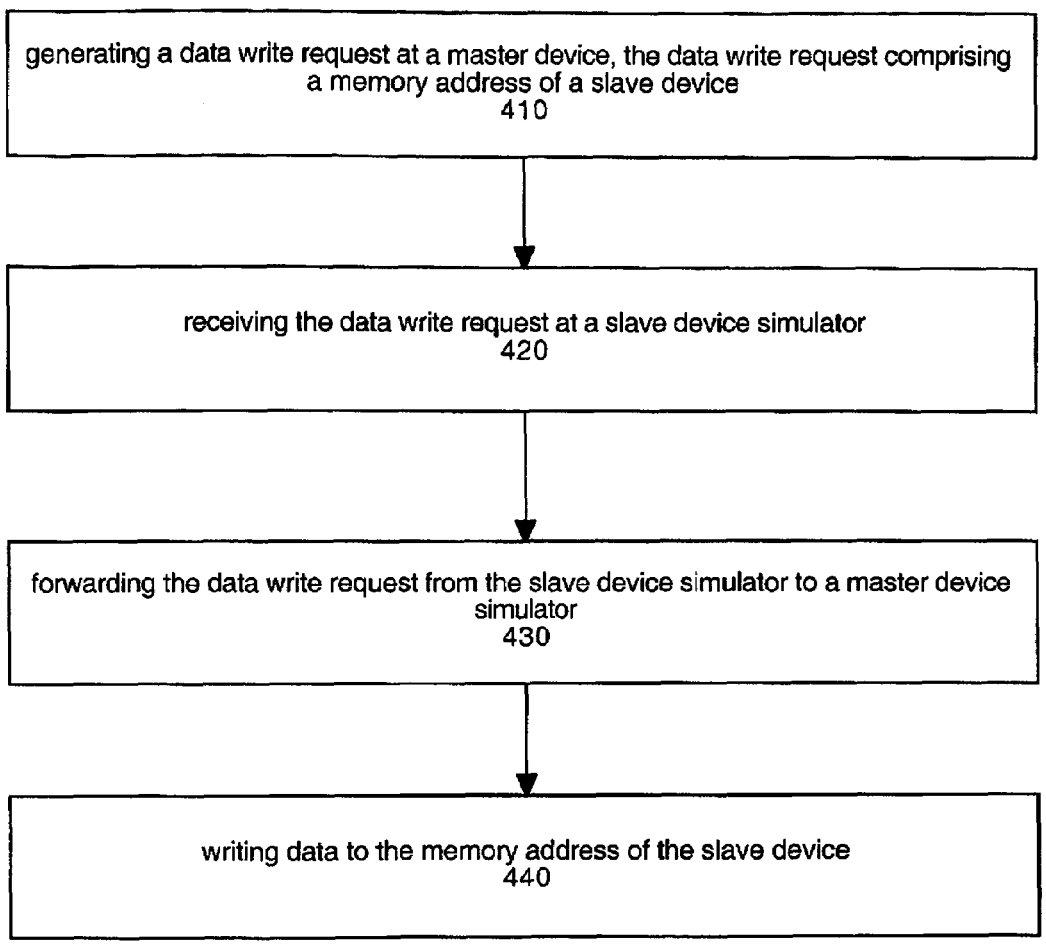
FIG. 4 is a flow diagram of an exemplary computer controlled method of writing data coherency in accordance with embodiments of the present invention.

FIG. 4 is a flow diagram of an exemplary computer controlled method 400 of writing data in accordance with embodiments of the present invention. In the case of a write, data flows in one direction from the master side to the slave side.

At step 410, embodiments of the present invention include generating a write request at a master device 110, the data write request comprises a memory address of a slave device and data to be written.

At step 420, embodiments of the present invention include receiving the data write request at the slave device simulator 115. In one embodiment of the invention, the slave device simulator 115 is coupled to the master device 110 via an I2C bus connection. The master device sees the slave device simulator 115 as the actual slave device and seamlessly communicates with the slave device simulator 115 as it would with the actual slave device 125. In one embodiment of the invention, the slave device simulator 115 uses simulator logic to function as a slave device.

At step 430, embodiments of the present invention include forwarding the data write request from the slave device simulator 115 to a master device simulator 120 over connection 113. In one embodiment of the invention, the slave device simulator 115 uses a request forwarder to forward the request from the master side of the system specific interconnection 113 to the slave side of the system specific interconnection 113. In one embodiment of the invention, the system specific interconnect 113 is a wireless connection. In another embodiment of the invention, the system specific interconnect 113 is a wired connection such as an Ethernet connection.

At step 440, embodiments of the present invention include the master device simulator 120 writing data to the memory address of the slave device 125. In one embodiment of the invention the master device simulator 120 comprises a request receiver that receives the request from the slave device simulator 115. Once the request is received, the master device simulator 120 executes the request as if it were an actual master device. The memory 169 on the slave device 125 is then updated in accordance with the data write.

FIG. 5 is a flow diagram of an exemplary computer controlled method 500 of maintaining data coherency in accordance with embodiments of the present invention. In one embodiment of the invention, a data coherency checker 330 (FIG. 3) maintains data coherency between the slave device 125 and the shadow memory 317 of a master device simulator. The master device simulator 120 then updates a shadow memory 217 of a slave device simulator 115 to reflect the contents of the slave device memory 169. Process 500 operates periodically e.g., during otherwise idle bus times.

At step 510, embodiments of the present invention include comparing the contents of slave device memory 169 to the contents of the master device simulator memory 317 for any differences. In one embodiment of the invention, the master device simulator 120 is constantly checking for changes to the slave device memory 169 in this fashion.

At step 520, embodiments of the present invention include identifying a difference between the slave device memory 169 and the master device simulator memory 317. In one embodiment of the invention, a data digest value (e.g., checksum) of the slave memory 169 is compared to a digest value of the master device simulator shadow memory 317. A difference in the value indicates that a change has been made. The memories are then scanned to identify the differences.

At step 530, embodiments of the present invention include forwarding the difference from the master device simulator 120 to a slave device simulator 115. In one embodiment of the invention, the master device simulator updates its shadow memory 317 to maintain coherency with the slave device memory 169. The master device simulator then forwards the data change to the slave device simulator 115.

At step 540, embodiments of the present invention include updating a slave device simulator memory 217 to reflect the change of the slave device memory 169. By maintaining coherency between the slave device memory 169, the master device simulator shadow memory 317 and the slave device simulator, the master device 110 can access the shadow memory 217 of the slave device simulator 115 as if it were the slave device memory 169 as described below.

It is appreciated that the data coherency process 500 will detect any data updates to memory 169 that originate from master device 110 or any other device capable of updating memory 169.

Figure 6:
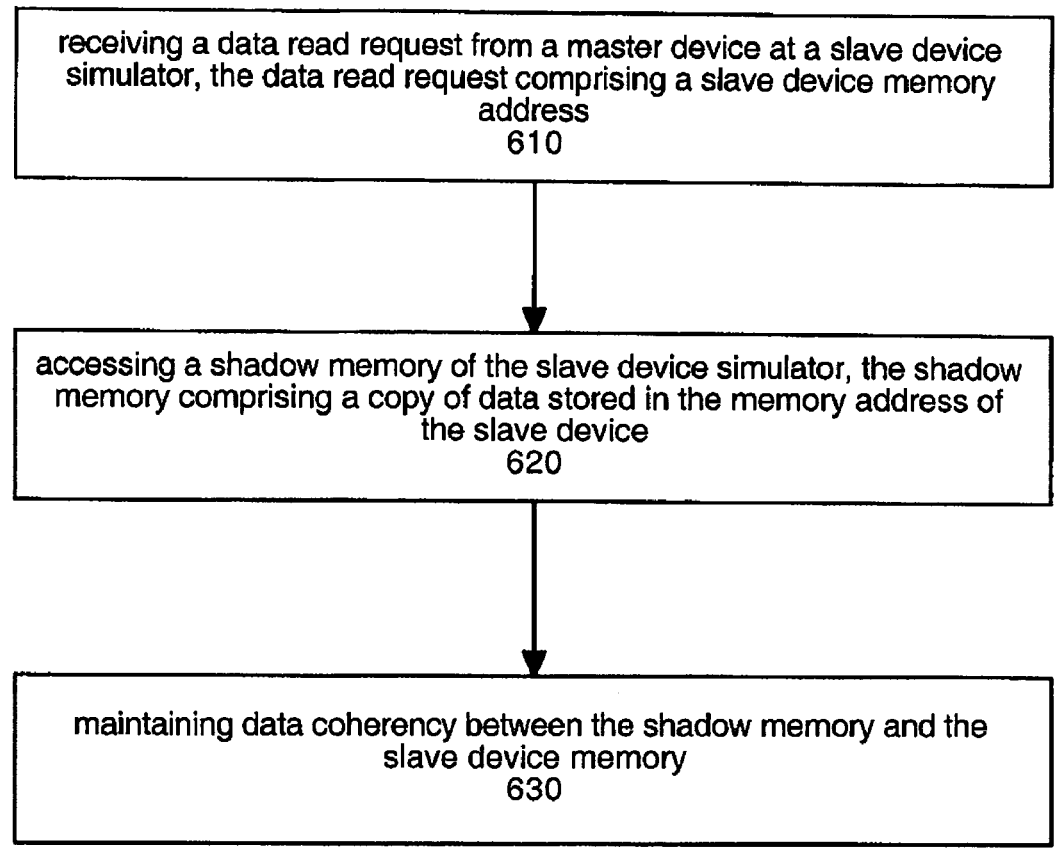
FIG. 6 is a flow diagram of an exemplary computer implemented method of reading data in accordance with embodiments of the present invention.

FIG. 6 is a flow diagram of an exemplary computer implemented method 600 of reading data in accordance with embodiments of the present invention.

At step 610, embodiments of the present invention include receiving a data read request from a master device 110 at a slave device simulator, the data read request comprising a slave device memory address.

At step 620, embodiments of the present invention include directly accessing a shadow memory 217 of the slave device simulator 115 to satisfy the read request, the shadow memory 217 comprising a copy of data stored in the memory address of the slave device 125. Since the shadow memories on both the slave device side and the master side are updated when changes are made to the slave device memory, the data in the slave device shadow memory 217 is coherent with the slave device memory 169. This allows the master device 110 to read slave device data without latency even if the slave device 125 is separated from the master device 110 by a long distance or separated by a non-I2C communication interface.

At step 630, embodiments of the present invention include maintaining data coherency between the shadow memory and the slave device. Process 500 of FIG. 5 describes how data coherency is maintained between the slave device memory and the slave device simulator shadow memory.

Figure 7:
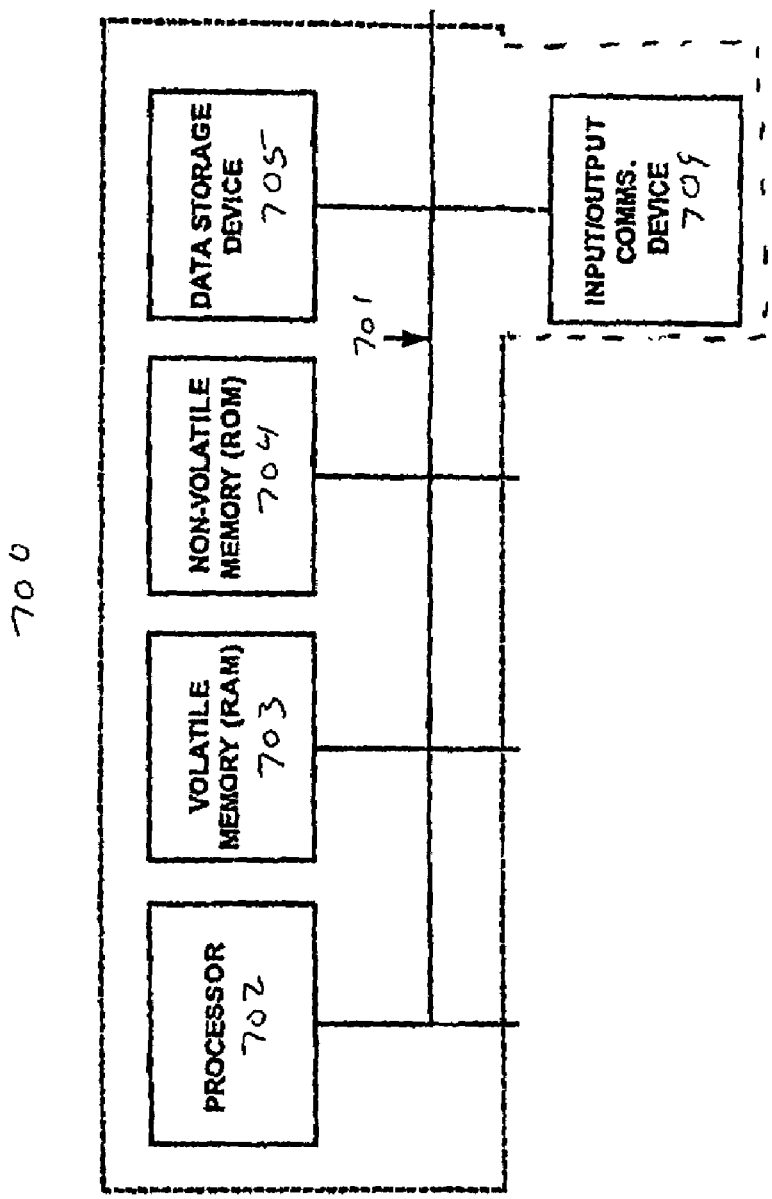
FIG. 7 is a block diagram of an exemplary computer system in accordance with embodiments of the present invention.

Referring now to FIG. 7, a block diagram of exemplary computer system 700 is shown. It is appreciated that computer system 700 of FIG. 7 described herein illustrates an exemplary configuration of an operational platform upon which embodiments of the simulators 216 and 316 of the present invention can be implemented. Other computer systems with differing configurations can also be used in place of computer system 700 within the scope of the present invention. For example, computer system 700 could be a server system, a node on a network, a personal computer or an embedded computer system such as a mobile telephone or pager system. Furthermore, computer system 700 could be a multiprocessor computer system.

Computer system 700 includes an address/data bus 701 for communicating information, a central processor 702 coupled with bus 701 for processing information and instructions, a volatile memory unit 703 (e.g., random access memory, static RAM, dynamic RAM, etc.) coupled with bus 701 for storing information and instructions for central processor 702 and a non-volatile memory unit 704 (e.g., read only memory, programmable ROM, flash memory, EPROM, EEPROM, etc.) coupled with bus 701 for storing static information and instructions for processor 702. Moreover, computer system 700 also includes a data storage device 705 (e.g., disk drive) for storing information and instructions.

Computer system 700 also includes signal communication interface 709, which is also coupled to bus 701, and can be a serial port. Communication interface 709 can also include number of wireless communication mechanisms such as infrared or a Bluetooth protocol.

This invention can also be contained within FPGAs (Field Programmable Gate Array) or similar logic—one for each side. These devices can contain both the implementing logic and the shadow memory components. Such FPGAs can be used as a stand alone implementation or in conjunction with more conventional processing computer components.

Embodiments of the present invention, an I2C bus extension via a shadow memory have been described. While the present invention has been described in particular embodiments, it should be appreciated that the present invention should not be construed as limited by such embodiments, but rather construed according to the following claims.

What is claimed is:

1. A communication system comprising:
    a master device coupled to a first serial bus;
    a slave device coupled to a second serial bus and comprising a first memory;
    a slave device simulator coupled to said first serial bus and coupled to a system specific interconnection, said slave device simulator comprising a first shadow memory of said first memory; and
    a master device simulator coupled to said second serial bus and coupled to said system specific interconnection, said master device comprising a second shadow memory of said slave device.

2. The system as described in claim 1 wherein said slave device simulator further comprises a request forwarder for forwarding a write request from said master device to said slave device via said system specific interconnection.

3. The system as described in claim 1 wherein said master device simulator further comprises a request receiver for receiving a write request from said slave device simulator via said system specific interconnection.

4. The system as described in claim 1 wherein said system specific interconnection is a wireless communication interface.

5. The system as described in claim 1 wherein said system specific interconnection is a serial communication interface.

6. The system as described in claim 1 wherein said master device simulator further comprises a memory coherency checker for checking coherency between said first memory and said first shadow memory.

7. The system as described in claim 1 wherein said master device is a digital media source.

8. The system as described in claim 1 wherein said slave device is a display device.

9. The system as described in claim 1 wherein said first serial bus and said second serial bus are substantially compliant with an inter integrated circuit (I2C) bus.

10. A method for writing data in a master-slave communication system comprising:
    generating a data write request at a master device, said data write request comprising a data and memory address of a slave device;
    receiving said data write request at a slave device simulator over a first serial bus;
    forwarding said data write request from said slave device simulator to a master device simulator; and
    writing data from said master device simulator to said memory address of said slave device which is coupled to said master device simulator using a second serial bus of the same bus type as said first serial bus.

11. The method as described in claim 10 wherein said slave device simulator and said master device simulator are coupled via a system specific bus not of said bus type.

12. The method as described in claim 10 wherein said bus type is substantially compliant with an inter integrated circuit (I2C) bus.

13. The method as described in claim 11 wherein said system specific bus is a wireless communication interface.

14. The method as described in claim 11 wherein said system specific bus is a RS 232 communication interface.

15. The method as described in claim 10 further comprising updating a shadow memory of said slave device simulator in response to said writing data to maintain data coherency between said shadow memory and a memory of said slave device.

16. The method as described in claim 15 wherein said bus type is substantially compliant with an inter integrated circuit (I2C) bus.

17. A method of maintaining data coherency in a master-slave communication system, said method comprising:
    comparing a value of a slave device memory to a value of a master device simulator memory;
    identifying a difference between said slave device memory and said master device simulator memory;
    forwarding said difference from said master device simulator to a slave device simulator;
    updating a slave device simulator shadow memory to reflect said change of said slave device memory wherein said shadow memory is operable to satisfy read commands from a master device coupled to said slave device simulator.

18. The method as described in claim 17 wherein said master device simulator is coupled to said slave device via a bus substantially compliant with an inter integrated circuit (I2C) bus.

19. The method as described in claim 17 wherein said forwarding is performed via a wireless communication interface.

20. The method as described in claim 17 wherein said forwarding is performed via an RS 232 communication interface.

21. A method for reading data in a master-slave communication system, said method comprising:
    receiving a data read request from a master device at a slave device simulator, said data read request comprising a slave device memory address;
    accessing a shadow memory of said slave device simulator, said shadow memory comprising a copy of data stored in said memory address of said slave device;
    supplying data from sad shadow memory in response to said data read request; and
    maintaining data coherency between said shadow memory and said slave device memory.

22. The method as described in claim 21 wherein said data read request is received at said slave device simulator via an inter integrated circuit (I2C) bus.

23. The method as described in claim 21 wherein said maintaining data coherency comprises:
- comparing a value of a slave device memory to a value of a master device simulator memory;
- identifying a difference between said slave device memory and said master device simulator memory;
- forwarding said difference from said master device simulator to said slave device simulator;
- updating said shadow memory of said slave device simulator to reflect said change of said slave device memory.

* * * * *